United States Patent
Morimoto

[11] Patent Number: 5,350,133
[45] Date of Patent: Sep. 27, 1994

[54] FISHING REEL HAVING AN IMPROVED CLUTCH MECHANISM

[75] Inventor: Shinichi Morimoto, Nishinomiya, Japan

[73] Assignee: Shimano Inc., Osaka, Japan

[21] Appl. No.: 903,478

[22] Filed: Jun. 24, 1992

[30] Foreign Application Priority Data

Jun. 27, 1991 [JP] Japan .................. 3-1555055

[51] Int. Cl.5 ............................ A01K 89/015
[52] U.S. Cl. .................. 242/261; 242/379; 242/323
[58] Field of Search ........... 242/260, 261, 262, 323, 242/279

[56] References Cited

U.S. PATENT DOCUMENTS

| | | | |
|---|---|---|---|
| 4,341,366 | 7/1982 | Kawada | 242/261 |
| 4,379,530 | 4/1983 | Kobayashi | 242/261 |
| 4,512,536 | 4/1985 | Sato | 242/261 |
| 4,564,158 | 1/1986 | Mousberg et al. | 242/261 |
| 4,570,878 | 2/1986 | Nakajima | 242/261 |
| 4,593,869 | 6/1986 | Yasui et al. | 242/261 |

FOREIGN PATENT DOCUMENTS 60-78526  5/1985  Japan .

Primary Examiner—Katherine Matecki
Attorney, Agent, or Firm—Dickstein, Shapiro & Morin

[57] ABSTRACT

A fishing reel includes a clutch mechanism disposed between a spool and a winding control system, and a pair of clutch controllers for disengaging the clutch mechanism. One of the clutch controllers has a toggle spring for causing this controller to retain the clutch mechanism in a disengaged position after a declutching operation. The other clutch controller has a coil spring for allowing a declutching operation in a momentary mode. Upon release of the other clutch controller after a declutching operation, the coil spring causes the clutch mechanism to return to an engaged position and the other clutch controller to an inoperative position.

12 Claims, 5 Drawing Sheets

FISHING REEL HAVING AN IMPROVED CLUTCH MECHANISM

BACKGROUND OF THE INVENTION

1. FIELD OF THE INVENTION

This invention relates to a fishing reel, and more particularly to an improvement in a fishing reel having a clutch mechanism disposed between a spool and a line winding system, and a control device for disengaging the clutch mechanism. Switching may be made between a mode (hereinafter referred to as a toggle mode) to retain the clutch mechanism in a disengaged position, and a mode (hereinafter referred to as a momentary mode) to return the clutch mechanism and control device to an original position, both when the control device is operated to disengage the clutch mechanism and is thereafter released.

2. DESCRIPTION OF THE RELATED ART

A fishing reel having the above construction is disclosed in Japanese Patent Publication Kokai No. 1985-78526 for example. The prior fishing reel includes a switching device exclusively for use in varying a support position of a spring provided for a clutch operating system. The switching device is operable to vary a dead point of the spring load, thereby selecting between the above two modes.

Generally, conventional reels have the toggle mode as a common feature. Many reels are constructed such that, after the clutch mechanism is disengaged in the toggle mode, the clutch mechanism is returned to an engaged position when a line winding handle is turned in a direction to take tip the fishing line. The momentary mode is often used in what is known as flipping style fishing in which the fishing line is taken up quickly after swinging and casting a lure or other bait.

The prior construction which controls the single spring with the switching device has the advantage of being simple and yet, capable of selecting between the two modes. However, when the angler wishes to confirm a mode selection in an actual fishing situation, he or she must recognize the position of the switching device visually or otherwise. Further, since the single spring is used, the prior construction becomes inoperable in either mode in the event of failure of the spring. Thus, there is room for improvement.

SUMMARY OF THE INVENTION

The object of the present invention is to provide an improved fishing reel which allows the toggle mode or momentary mode to be selected quickly for a clutch operation and in which the two modes never become unavailable at the same time even when a trouble occurs with the control system.

The above object is fulfilled, according to the present, invention, by a, fishing reel comprising a clutch mechanism and a control device for disengaging the clutch mechanism as noted in the outset hereof, wherein the control device includes a pair of clutch controllers, one of which has a toggle action mechanism for causing this clutch controller to retain the clutch mechanism in a disengaged position after a declutching operation, and the other has a momentary action mechanism operable, upon release of this other clutch controller after a declutching operation, for returning the clutch mechanism to an engaged position and the other clutch controller to an inoperative position.

This construction has the following functions and effects:

Where the above features of the invention are arranged as shown in FIGS. 1 and 2, one controller A1 may operate the clutch mechanism C in the toggle mode, and the other controller A2 in the momentary mode. A toggle action mechanism T is included in a control system interlocked to the one controller A1, while a momentary action mechanism M is included in a control system interlocked to the other controller A2. Even if one of the control systems should break down, the other control system would remain operable to control the clutch mechanism C.

This invention does not employ a switching device as in the prior art, but employs the two controllers exclusively for the toggle and momentary modes, respectively. Mode switching requires no switching operation. In addition, a clutch operation may effected in each mode without a mode confirmation. Where, as here, the controllers and control systems are provided in pairs, a trouble occurring with one pair would not interfere with operation of the other pair.

Thus, the present invention provides an improved fishing reel which allows the-toggle mode or momentary mode to be selected quickly for a clutch operation and in which the two modes never become unavailable at the same time even when trouble occurs with the control system.

In a further aspect of the present invention, a fishing reel comprises a pair of clutch mechanisms or clutch operating systems disposed between a spool and a winding control system, a clutch controller for disengaging the clutch mechanisms, a toggle action mechanism for causing the clutch controller to retain one of the clutch mechanisms in a disengaged position after a declutching operation, and a momentary action mechanism operable, upon release of the controller after a declutching operation, for returning the other clutch mechanism to an engaged position and the clutch controller to an inoperative position.

According to this construction, a spring load and an operating stroke of each of the toggle action mechanism and momentary action mechanism may be set without regard to those of the other. This provides the additional advantage that an operation may be carried out in each mode with an optimal feeling of handiness in an actual fishing situation.

Other features and advantages of the present invention will be apparent from the following description of the preferred embodiments taken with reference to the accompanying drawings.

DETAILED DESCRIPTION OF THE PREFERRED EMBODIMENTS

A fishing reel according to the present invention will be described in detail with reference to the drawings.

Figure 1:
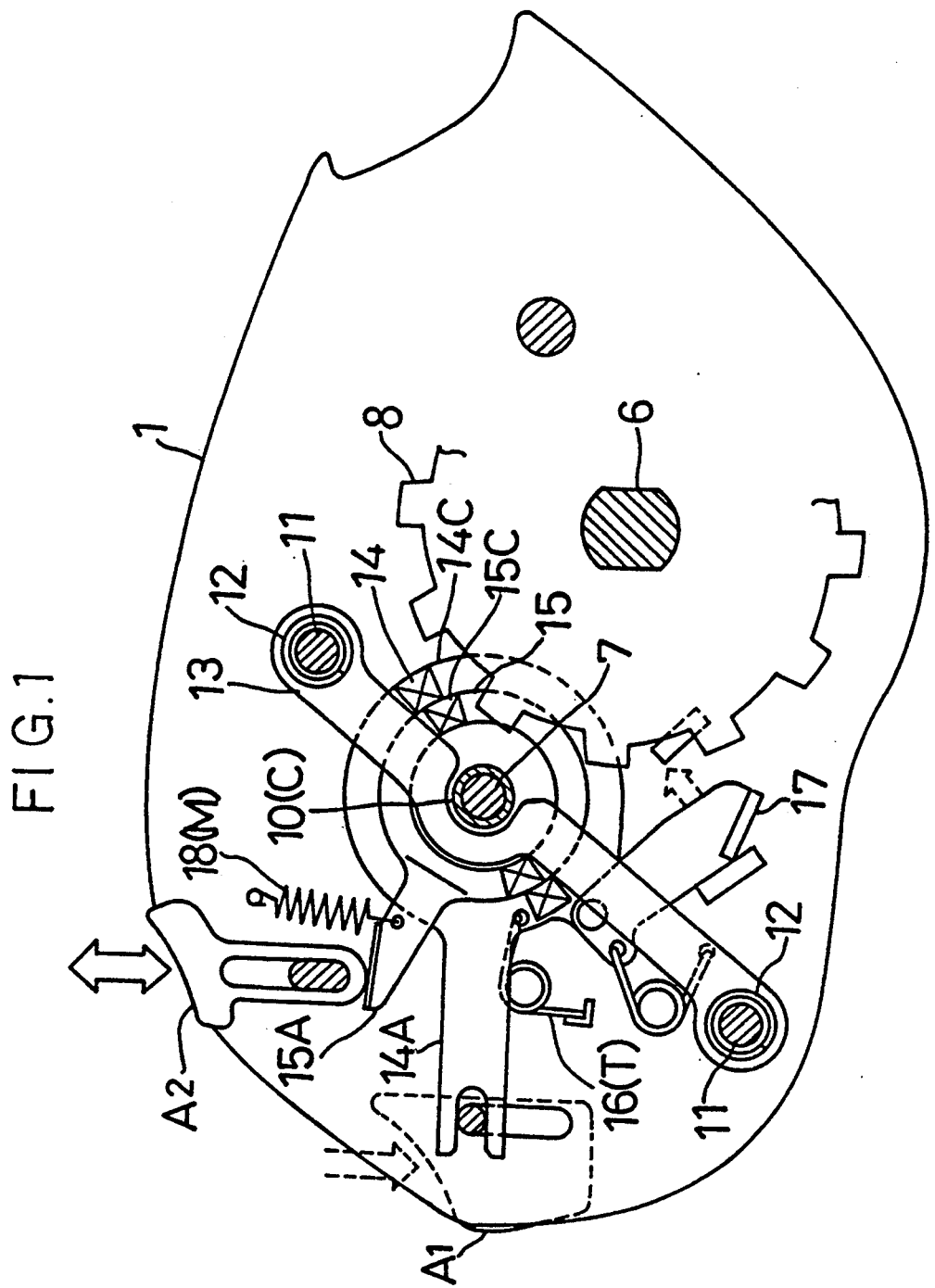
FIG. 1 is a side view of a clutch operating system.
Figure 2:
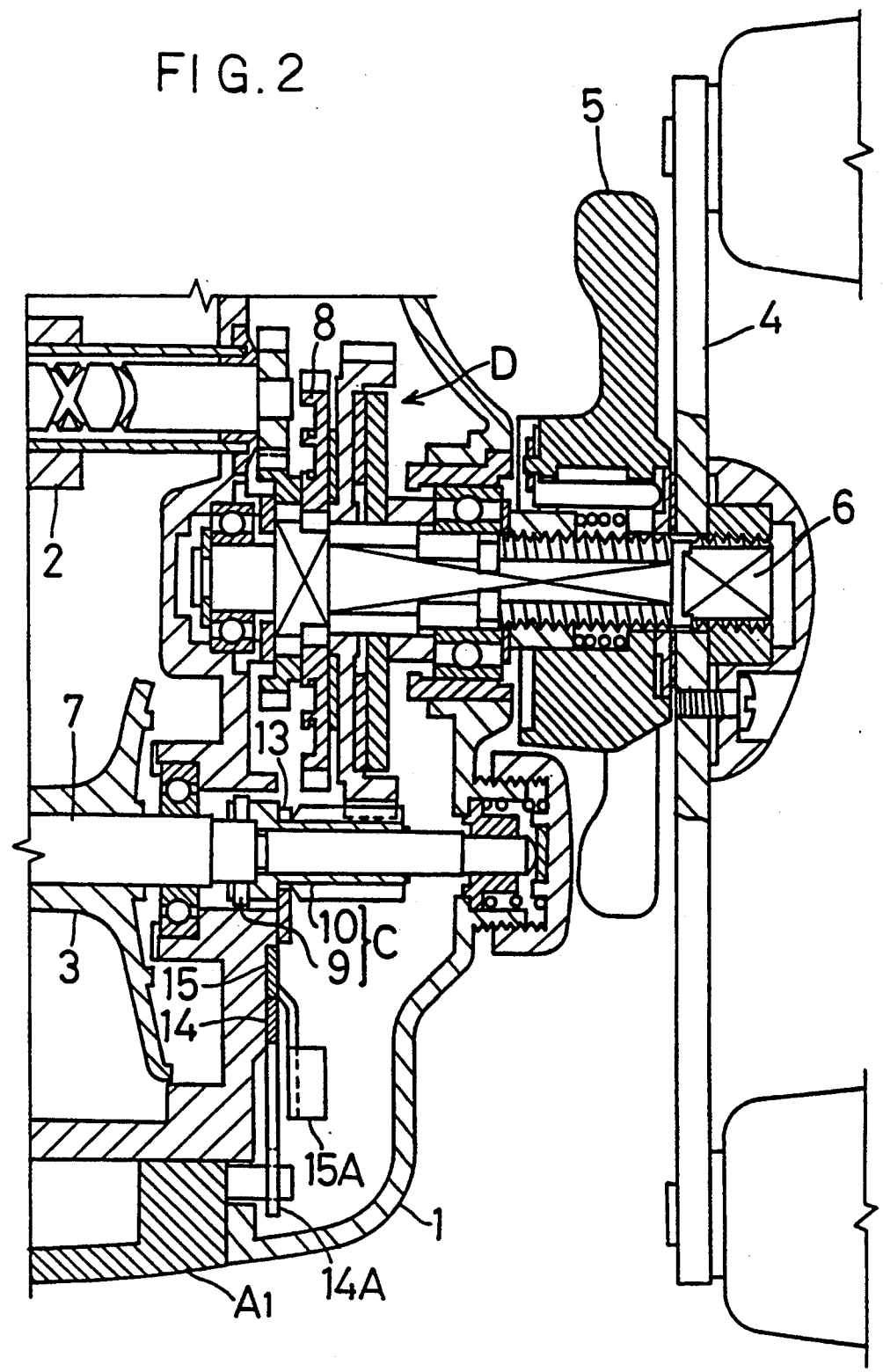
FIG. 2 is a plan view in cross section showing the clutch operating system.
Figure 3:
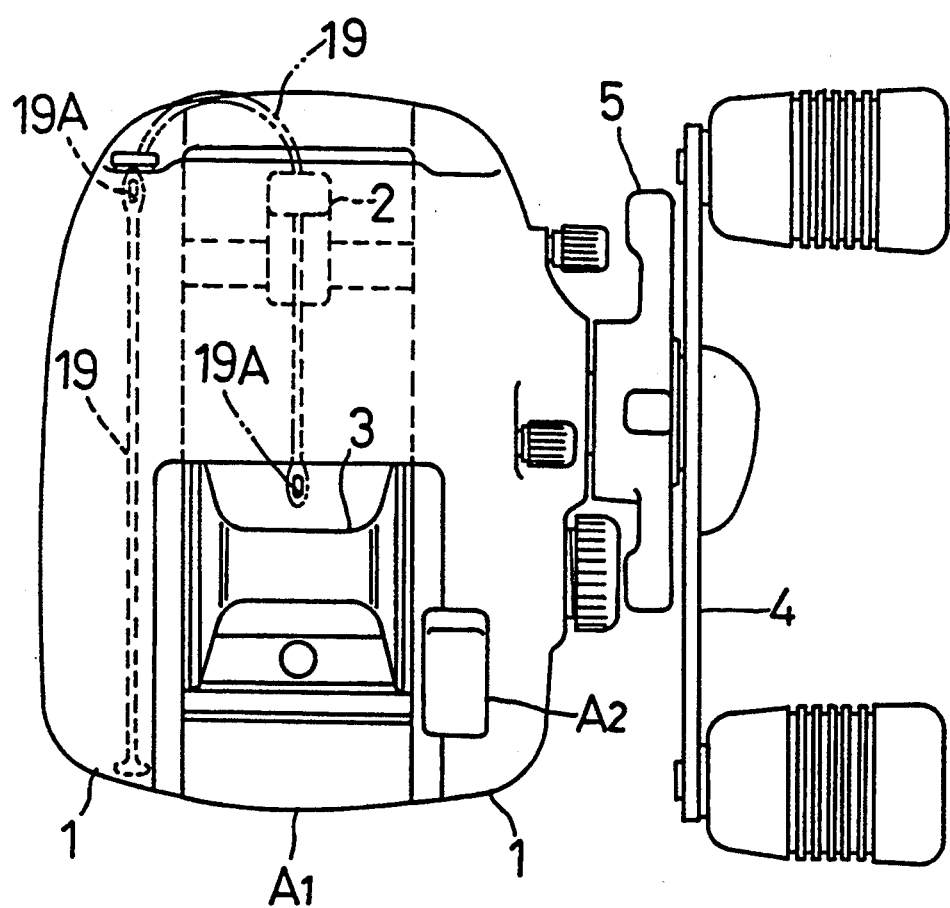
FIG. 3 is a plan view of a fishing reel.

FIGS. 1 through 3 show a baitcasting reel according to the present invention. The reel comprises right and left, side cases 1 constituting a reel body and supporting therebetween a level winder 2 and a spool 3 for winding a fishing line not shown. The right side case 1 has a handle 4 for taking up the fishing line, and a drag controller 5, both disposed outwardly of the right side case 1.

The right side case 1 rotatably supports a handle shaft 6 connected to the handle 4. An operating force is transmitted from the handle shaft 6 to the spool 3 through a drag mechanism D, a clutch mechanism C and a spool shaft 7. The handle shaft 6 supports a ratchet wheel 8 to prevent backward turning of the handle 4.

The clutch mechanism C includes a pin 9 formed on the spool shaft 7 to act as a pivot member, and a sleeve 10 slidable into and out of engagement with the pin 9. The sleeve 10 is engaged with a yoke 13 slidably supported on a pair of support shafts 11. Coil springs 12 are mounted on the support shafts 11. respectively, to bias the yoke 13 to a clutch engaging position. The yoke 13 is operable to a declutching position by rotation of one of a first rotatable cam 14 and a second rotatable cam 15 arranged coaxially with the spool shaft 7.

The first and second cams 14 and 15 define ride-on type cam portions 14C and 15C for contacting the yoke 13, respectively.

The first cam 14 is interlocked to a thumb rest type first controller A1 through a first arm portion 14A. The second cam 15 is interlocked to a button type second controller A2 through a second arm portion 15A. A toggle spring 16 acts on the first cam 14 to retain the clutch mechanism C in a disengaged position after the first controller A1 is depressed to disengage the clutch mechanism C. When, in this state, the handle 4 is turned to take up the fishing line, a return arm 17 contacts the ratchet wheel 8 and returns the first cam 14 to a clutch engaging position.

The second cam 15 has a coil spring 18 for returning the second cam 15 and second controller A2 to a clutch engaging position when the second controller A2 is depressed to disengage the clutch mechanism C and is thereafter released.

Thus, the first controller A1 is used exclusively for a toggle mode, with the toggle spring 16 acting as a toggle action mechanism T. The second controller A2 is used exclusively for a momentary mode, with the coil spring 18 acting as a momentary action mechanism M. When any one of the contollers A1 and A2 is operated, the clutch mechanism C is disengaged to allow free rotation of the spool 3.

Numeral 19 denotes a line passing aid. For passing the fishing line through the level winder 2, the aid 19 is extended through an opening of the level winder 2 as shown in phantom lines. Then the fishing line is passed through an eye 19A formed in an extreme end of the aid 9. In this state, the aid 9 is pulled forward.

Other embodiments of the present invention will be described next.

Figure 4:
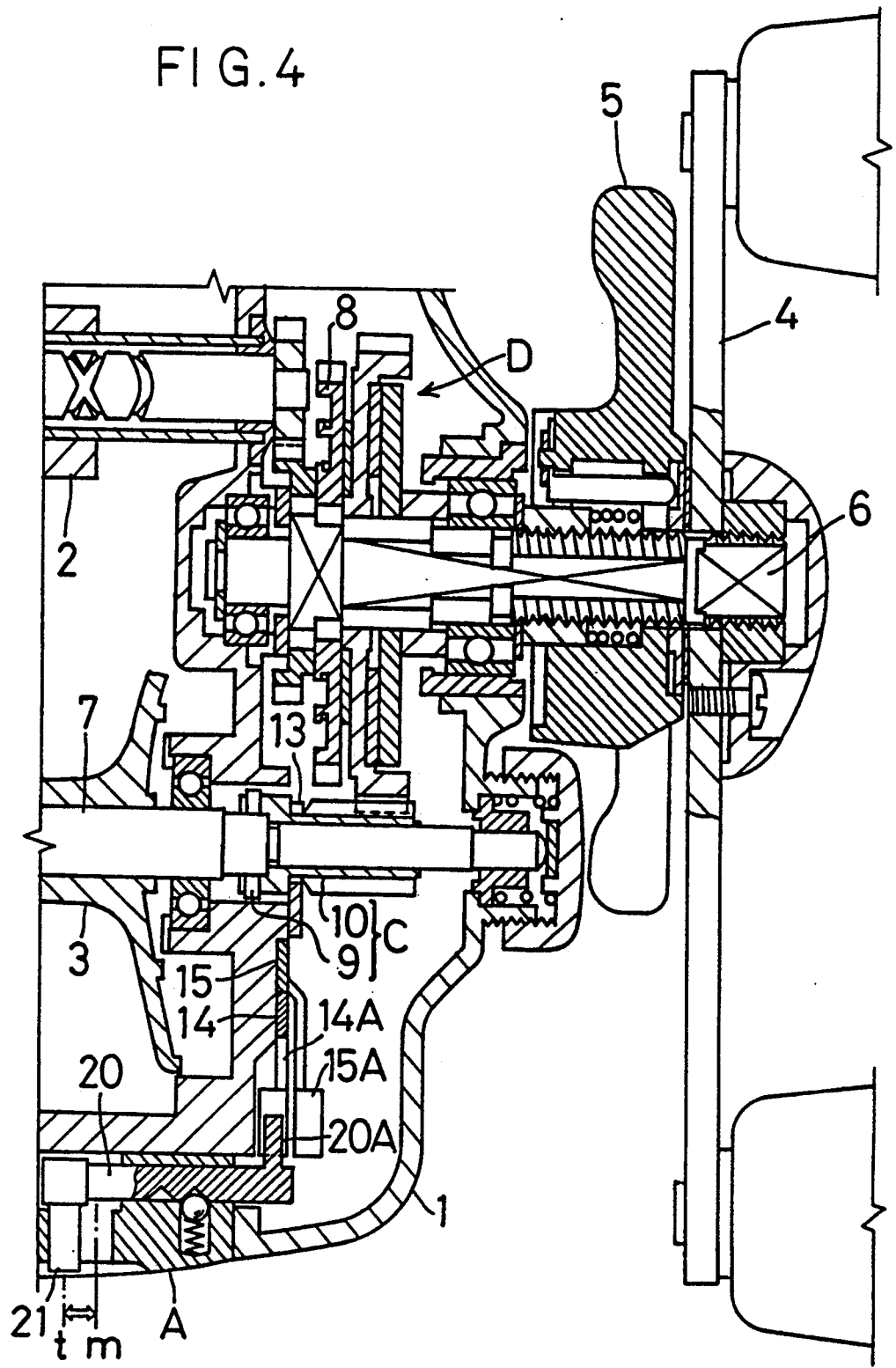
FIG. 4 is a sectional view of a different embodiment (a)

(a) Referring to FIG. 4, a clutch mechanism C, as in the foregoing embodiment, includes a first cam 14 having a toggle action mechanism T, and a second cam 15 having a momentary action mechanism M. The cams 14 and 15 have arms 14A and 15A extending therefrom, respectively. A single control let A includes a control element 20 extendible and retractable relative thereto and having an end 20A selectively engageable with ends of the arms 14A and 15A. The control element 20 is interlocked to a lever 21 movable between a toggle mode position t and a momentary mode position m. Thus, the clutch mechanism C may be operated in the toggle mode when the lever 21 is set to the toggle mode position t, and in the momentary mode when the lever 21 is set to the momentary mode position m.

Figure 5:
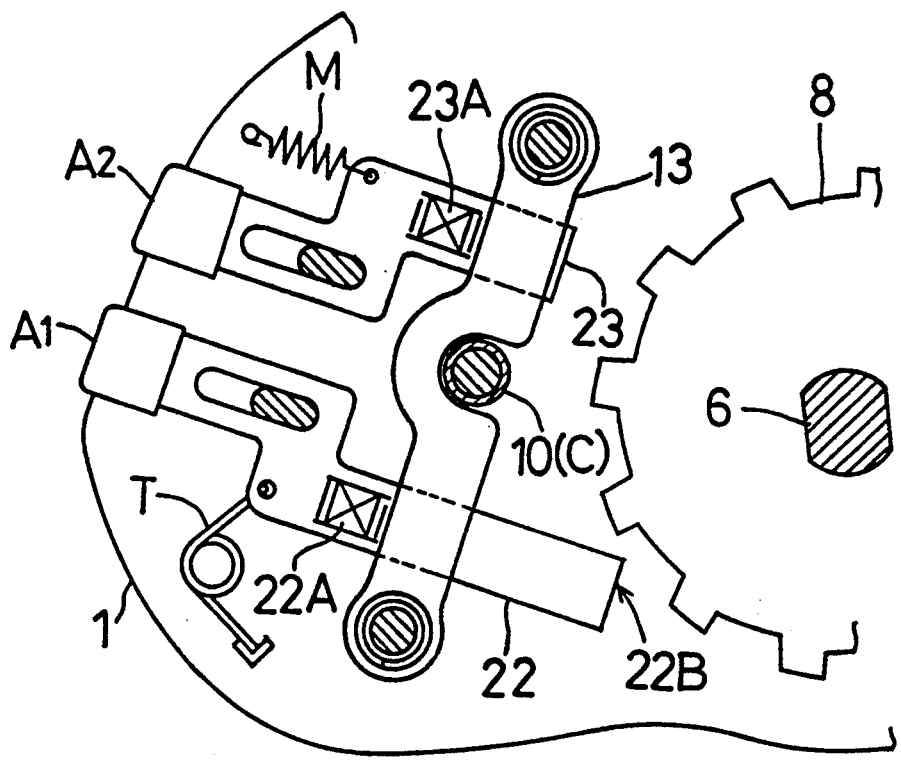
FIG. 5 is a sectional view of a different embodiment (b)

(b) In the embodiment shown in FIG. 5, a toggle action mechanism T acts on a first cam plate 22 including a cam surface 22A, and a momentary action mechanism M acts on a second cam plate 23 including a cam surface 23A, for operating the yoke 12 engaged with the sleeve 10. The first cam plate 22 defines a first control let A1, while the second cam plate 23 defines a second controller A2. This construction provides a slide type control system.

Further, the first cam plate 22 has an end 221B for contacting the ratchet wheel 8. According to this construction, when the handle 4 is turned in the direction to take up the fishing line with the clutch mechanism C disengaged, the clutch mechanism C is returned to the engaged position.

Figure 6:
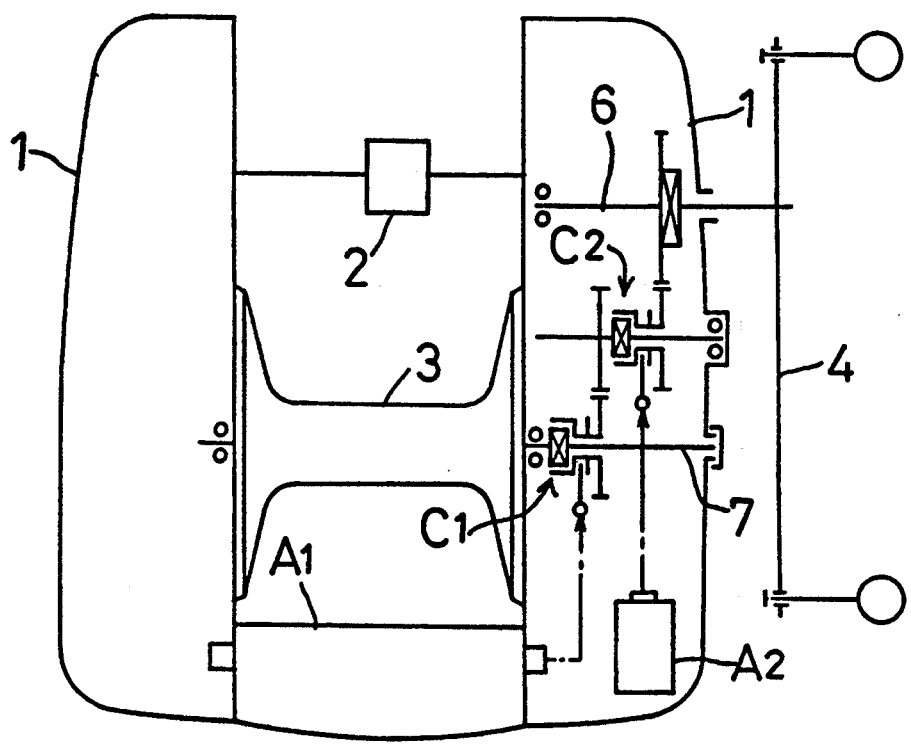
FIG. 6 is a sectional view of a different embodiment (c).

(c) The embodiment shown in FIG. 6 includes a first clutch mechanism C1 and a second clutch mechanism C2 arranged in series in a transmission line from the handle 4 to the spool shaft 7. The first clutch mechanism C1 is interlocked to a toggle action mechanism T (not shown) and a first controller A1. The second clutch mechanism C2 is interlocked to a momentary action mechanism M (not, shown) and a second controller A2. Thus, two separate clutch and clutch operating systems are provided.

What is claimed is:

1. A fishing reel comprising:
    a spool connected to a spool shaft;
    a winding control system for rotating said spool shaft;
    a clutch mechanism for engaging said winding control system with said spool shaft and for disengaging said winding control system from said spool shaft;
    a pair of clutch controllers each of which is movable from a rest position to an operable position to cause said clutch mechanism to disengage said winding control system from said spool shaft;
    a toggle action mechanism coupled exclusively to a first of said clutch controllers for causing said first clutch controller to retain said clutch mechanism in a condition where said winding control system is disengaging from said spool shaft after said first clutch controller moves to its operable position; and
    a momentary action mechanism coupled exclusively to a second of said clutch controllers for causing said second clutch controller to return to its rest position from its operable position, and for causing said clutch mechanism to engage said winding control system with said spool shaft, after an operating force applied to said second clutch controller is released.

2. A fishing reel as claimed in claim 1, wherein said clutch mechanism includes an engaging member formed on said spool shaft, and a sleeve which rotates in response to operation of said winding control system and which is slidable into and out of driving engagement with said engaging member.

3. A fishing reel as claimed in claim 2, wherein said first clutch controller comprises a first cam plate having a cam surface for operating a yoke engaged with said sleeve, and said second clutch controller comprises a second cam plate having a cam surface for operating said yoke.

4. A fishing reel comprising:
   a spool connected to a spool shaft;
   a winding control system for rotating said spool shaft;
   a clutch mechanism for engaging said winding control system with said spool shaft and for disengaging said winding control system from said spool shaft;
   a pair of clutch controllers each of which is movable from a rest position to an operable position to cause said clutch mechanism to disengage said winding control system from said spool shaft;
   a toggle action mechanism coupled to a first of said clutch controllers for causing said first clutch controller to retain said clutch mechanism in a condition where said winding control system is disengaging from said spool shaft after said on clutch controller moves to its operable position; and
   a momentary action mechanism coupled to a second of said clutch controllers for causing said second clutch controller to return to its rest position from its operable position, and for causing said clutch mechanism to engage said winding control system with said spool shaft, after an operating force applied to said other clutch controller is released;
   wherein said clutch mechanism includes an engaging member formed on said spool shaft, and a sleeve which rotates in response to operation of said winding control system and which is slidable into and out of driving engagement with said engaging member; and
   wherein said sleeve is engaged with a yoke slidably supported on a pair of support shafts and biased to a clutch engaging position by elastic members mounted on said support shafts, said yoke being operable to a declutching position by rotation of one of a first rotatable cam and a second rotatable cam, both said first and said second rotatable cams being arranged coaxially with said spool shaft, said first and second rotatable cams rotating in respective response to the operation of said clutch controllers from said rest to said operable position.

5. A fishing reel as claimed in claim 4, wherein said first and second cams comprise type cam portions for contacting said yoke, respectively.

6. A fishing reel as claimed in claim 4, wherein said first clutch controller is interlocked to said first cam through a first arm portion extending from said first cam, and said second clutch controller is interlocked to said second cam through a second arm portion extending from said second cam.

7. A fishing reel as claimed in claim 6, wherein said first clutch controller is operable exclusively for a toggle mode, said toggle action mechanism including a toggle spring for acting on said first cam to retain said clutch mechanism in the disengaged position after said first clutch controller is depressed to disengage said clutch mechanism.

8. A fishing reel as claimed in claim 6, wherein said second clutch controller is operable exclusively for a momentary mode, said momentary action mechanism including a coil spring for returning said second cam and said second clutch controller to a clutch engaging position when said second clutch controller is depressed to disengage said clutch mechanism and is thereafter released.

9. A fishing reel comprising:
   a spool connected to a spool shaft;
   a winding control system for rotating said spool shaft;
   first and second clutch mechanisms for engaging said winding control system with said spool shaft and for disengaging said winding control system from said spool shaft;
   first and second clutch controllers, each of which is movable from a rest position to an operable position to cause one of said first and second clutch mechanisms respectively associated therewith to disengage said winding control system from said spool shaft;
   a toggle action mechanism coupled to said first of said clutch controllers for causing said first clutch controller to retain said first of said clutch mechanisms respectively associated therewith in a condition where said winding control system is disengaging from said spool shaft after said first clutch controller moves to its operable position; and
   a momentary action mechanism coupled to a second of said clutch controllers for causing said second clutch controller to return to its rest position from its operable position, and for causing said second clutch mechanism respectively associated therewith to engage said winding control system with said spool shaft, after an operating force applied to said second clutch controller is released.

10. A fishing reel as claimed in claim 9, wherein first clutch mechanism respectively associated with said first clutch controller includes an engaging member formed on said spool shaft, and a sleeve which rotates in response to operation of said winding control system and which is slidable into and out of driving engagement with said engaging member.

11. A fishing reel comprising:
    a spool;
    a winding control system for rotating said spool shaft;
    first and second clutch mechanisms for engaging said winding control system with said spool shaft and for disengaging said winding control system from said spool shaft;
    first and second clutch controllers, each of which is movable from a rest position to an operable position to cause one of said first and second clutch mechanisms respectively associated therewith to disengage said winding control system from said spool shaft;
    a toggle action mechanism coupled to said first of said clutch controllers for causing said first clutch controller to retain said first of said clutch mechanisms respectively associated therewith in a condition where said winding control system is disengaging from said spool shaft after said first clutch controller moves to its operable position; and
    a momentary action mechanism coupled to said second of said clutch controllers for causing said second clutch controller to return to its rest position from its operable position, and for causing said second of said clutch mechanisms respectively associated therewith to engage said winding control system with said spool shaft, after an operating force applied to said second clutch controller is released;
    wherein said first clutch mechanism includes an engaging member formed on a spool shaft, and a sleeve which rotates in response to operation of said winding control system and which is slidable into and out of driying engagement with said engaging member;

wherein said sleeve is engaged with a yoke slidably supported on a pair of support shafts and biased to a clutch engaging position by elastic members mounted on said support shafts, said yoke being operable to a declutching position by rotation of one of a first rotatable cam and a second rotatable cam both said first and said second rotatable cams being arranged coaxially with said spool shaft, said first and second rotatable cams rotating in respective response to the operation of said clutch controllers from said rest to said operable position.

12. A fishing reel as claimed in claim 11, wherein said first and second cams comprise cam portions for contacting said yoke, respectively.

* * * * *